United States Patent
Mondkar et al.

(10) Patent No.: US 10,837,272 B2
(45) Date of Patent: Nov. 17, 2020

(54) HYDROCARBON GAS TREATMENT SYSTEMS AND METHODS

(71) Applicants: Suhas P. Mondkar, Houston, TX (US); P. Scott Northrop, The Woodlands, TX (US)

(72) Inventors: Suhas P. Mondkar, Houston, TX (US); P. Scott Northrop, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/436,414

(22) Filed: Jun. 10, 2019

(65) Prior Publication Data

US 2019/0390541 A1 Dec. 26, 2019

Related U.S. Application Data

(60) Provisional application No. 62/690,129, filed on Jun. 26, 2018.

(51) Int. Cl.
*B01D 53/14* (2006.01)
*E21B 43/34* (2006.01)

(52) U.S. Cl.
CPC .......... *E21B 43/34* (2013.01); *B01D 53/1462* (2013.01); *B01D 2256/24* (2013.01); *B01D 2257/304* (2013.01)

(58) Field of Classification Search
CPC .......... B01D 2256/24; B01D 2256/245; B01D 2257/304; B01D 53/1425; B01D 53/1462;
(Continued)

(56) References Cited

U.S. PATENT DOCUMENTS 7,147,691 B2 * 12/2006 Palmer ............... B01D 53/1456
95/186
7,635,408 B2 12/2009 Mak et al.
(Continued)

OTHER PUBLICATIONS

Lunsford, K., et al. (1999) "Decreasing Contactor Temperature Could Increase Performance," Proceedings of the Seventy-Eighth Gas Processors Association Annual Convention. Nashville, TN, pp. 121-127.

*Primary Examiner* — Cabrena Holecek
(74) *Attorney, Agent, or Firm* — ExxonMobil Upstream Research Company—Law Department

(57) ABSTRACT

Hydrocarbon gas treatment systems and methods. The hydrocarbon gas treatment systems include a feed gas supply system configured to provide a feed gas stream and a hydrogen sulfide removal system configured to separate the feed gas stream into a product gas stream and an acid gas stream. The hydrocarbon gas treatment systems also include a heat exchanger configured to cool the acid gas stream to generate a cooled acid gas stream and an acid gas enrichment system configured to separate the cooled acid gas stream into a treated gas stream and an enriched acid gas stream. The methods include providing a feed gas stream, separating the feed gas stream into a product gas stream and an acid gas stream, cooling the acid gas stream to generate a cooled acid gas stream, and separating the cooled acid gas stream into a treated gas stream and an enriched acid gas stream.

20 Claims, 3 Drawing Sheets

(58) Field of Classification Search
CPC ............. C10L 2290/06; C10L 2290/08; C10L 2290/10; C10L 2290/12; C10L 2290/46; C10L 2290/541; C10L 2290/543; C10L 2290/545; C10L 2290/547; C10L 3/102; C10L 3/103; C10L 3/104; C10L 3/106; E21B 43/34
See application file for complete search history.

(56) References Cited

U.S. PATENT DOCUMENTS

| | | | |
|---|---|---|---|
| 8,821,615 B2 | 9/2014 | Weiss et al. | |
| 8,845,788 B2 * | 9/2014 | Mak .......................... | C10K 1/08 95/173 |
| 2011/0268650 A1 * | 11/2011 | Lamar .................. | B01D 53/485 423/576.2 |

* cited by examiner

HYDROCARBON GAS TREATMENT SYSTEMS AND METHODS

CROSS REFERENCE TO RELATED APPLICATION

This application claims the priority benefit of U.S. Provisional Patent Application No. 62/690,129 filed Jun. 26, 2018, entitled HYDROCARBON GAS TREATMENT SYSTEMS AND METHODS.

FIELD OF THE DISCLOSURE

The present disclosure relates generally to hydrocarbon gas treatment systems and methods, and more particularly to hydrocarbon gas treatment systems and methods that separate a feed gas stream into a product gas stream and an acid gas stream and which subsequently separate the acid gas stream into a treated gas stream and an enriched acid gas stream.

BACKGROUND OF THE DISCLOSURE

Raw natural gas streams that are produced from subterranean formations may contain natural gas (e.g., primarily methane) and acidic impurities, such as carbon dioxide, hydrogen sulfide, mercaptans, and/or other trace sulfur compounds. It may be desirable to remove these acidic impurities prior to shipment, sale, and/or usage of the natural gas, such as by separating the acidic impurities from the natural gas. Several processes historically have been utilized to remove the acidic impurities; however, the equipment utilized to accomplish the necessary separation may be large, expensive to install, and/or expensive to operate, thereby decreasing an economic viability of acidic natural gas. Thus, there exists a need for improved hydrocarbon gas treatment systems and methods.

SUMMARY OF THE DISCLOSURE

Hydrocarbon gas treatment systems and methods. The hydrocarbon gas treatment systems include a feed gas supply system, a hydrogen sulfide removal system, a heat exchanger, and an acid gas enrichment system. The feed gas supply system is configured to provide a feed gas stream that includes hydrocarbon gas, carbon dioxide, and hydrogen sulfide. The hydrogen sulfide removal system is configured to separate the feed gas stream into a product gas stream and an acid gas stream. The product gas stream includes a substantial portion of the hydrocarbon gas from the feed gas stream, and the acid gas stream includes carbon dioxide and a substantial portion of the hydrogen sulfide from the feed gas stream. The heat exchanger is configured to cool the acid gas stream to generate a cooled acid gas stream. The acid gas enrichment system is configured to separate at least a portion of the cooled acid gas stream into a treated gas stream and an enriched acid gas stream. The treated gas stream includes a substantial portion of the carbon dioxide from the portion of the cooled acid gas stream that is delivered to the acid gas enrichment system, and the enriched acid gas stream includes a substantial portion of the hydrogen sulfide from the cooled acid gas stream.

The methods include providing a feed gas stream to a hydrogen sulfide removal system and separating the feed gas stream into a product gas stream and an acid gas stream. The methods also include cooling the acid gas stream to generate a cooled acid gas stream, and separating the cooled acid gas stream into a treated gas stream and an enriched acid gas stream.

DETAILED DESCRIPTION AND BEST MODE OF THE DISCLOSURE

Figure 1:
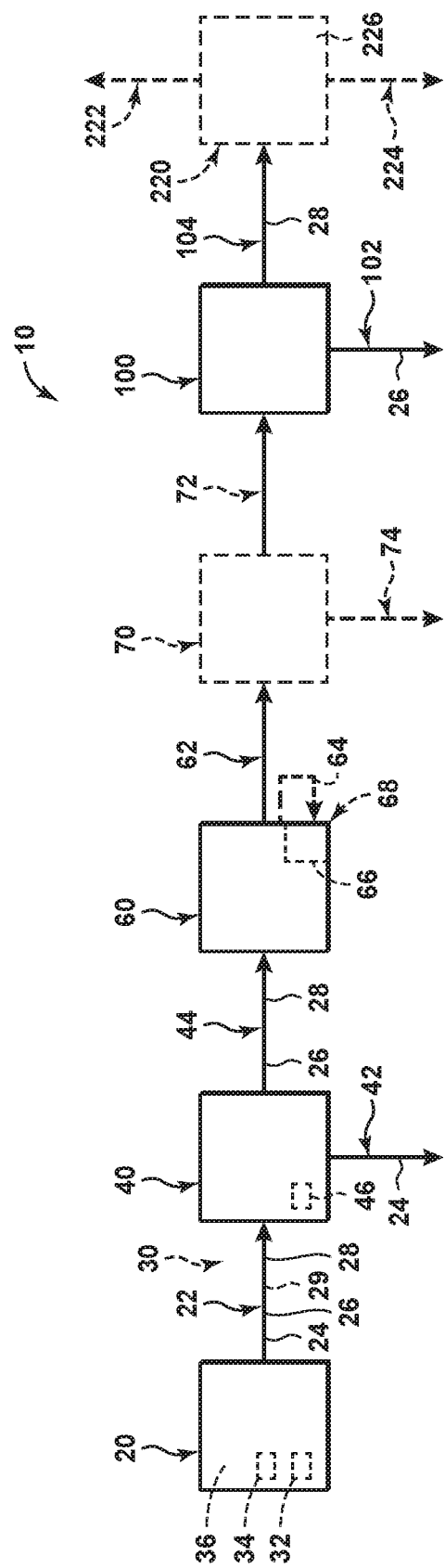
FIG. 1 is a schematic representation of examples of hydrocarbon gas treatment systems according to the present disclosure.
Figure 2:
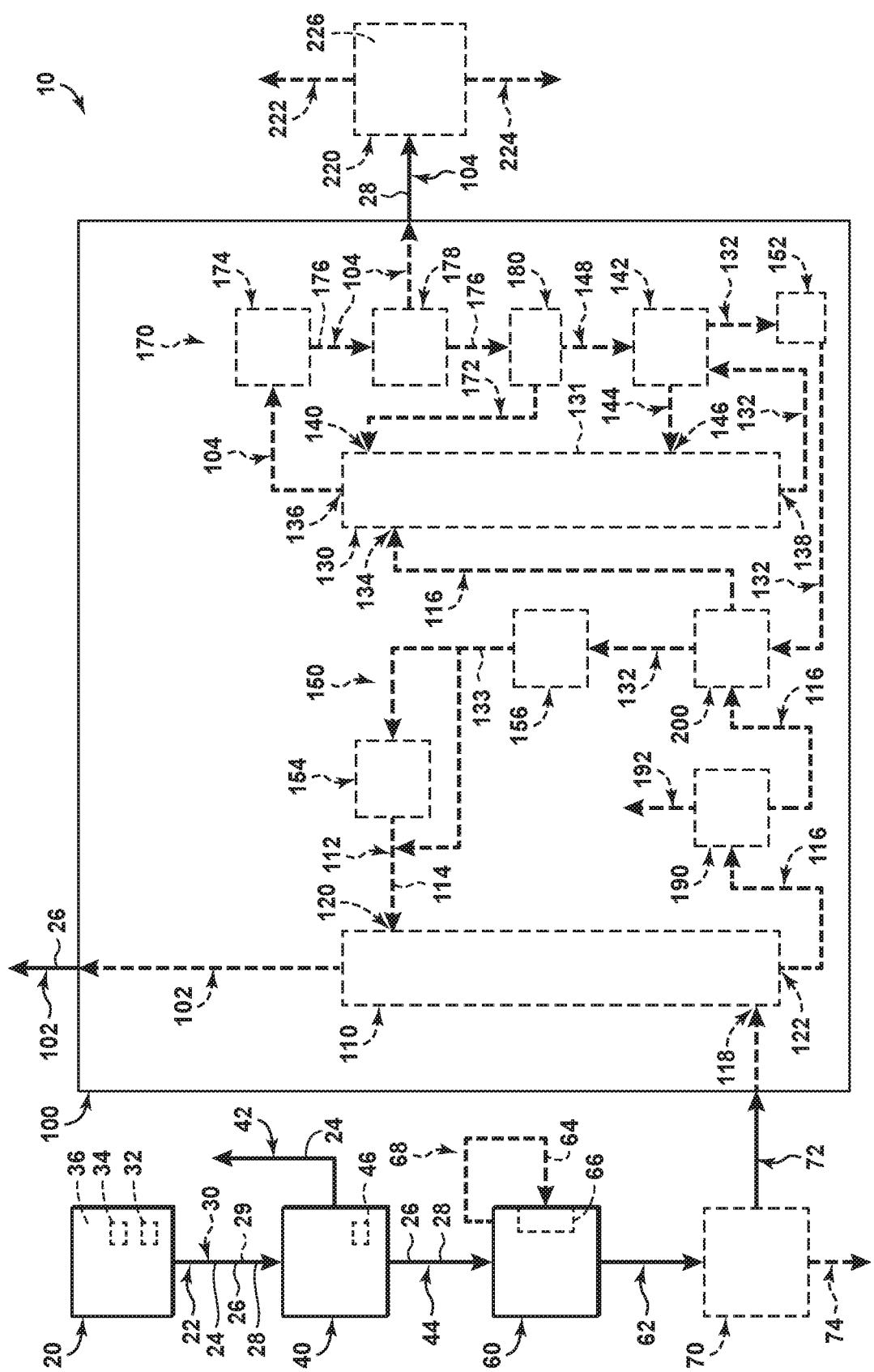
FIG. 2 is another schematic representation of examples of hydrocarbon gas treatment systems according to the present disclosure.
Figure 3:
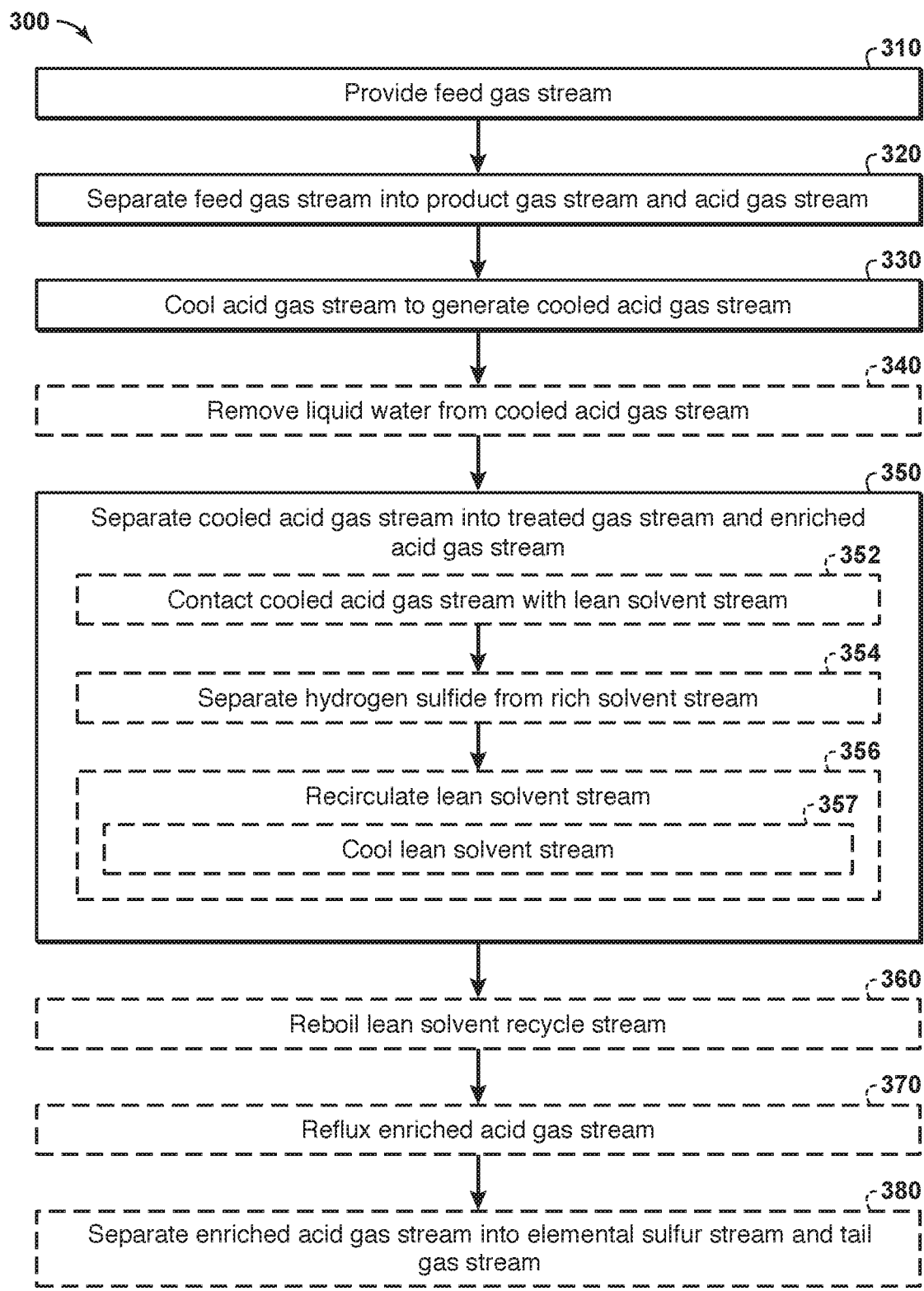
FIG. 3 is a flowchart depicting methods, according to the present disclosure, of treating a hydrocarbon gas.

FIGS. 1-3 provide examples of hydrocarbon gas treatment systems 10 and/or of methods 300, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic representation of examples of hydrocarbon gas treatment systems 10 according to the present disclosure, and FIG. 2 is another schematic representation of examples of hydrocarbon gas treatment systems 10 according to the present disclosure. As illustrated in FIGS. 1-2, hydrocarbon gas treatment systems 10 include a feed gas supply system 20, a hydrogen sulfide removal system 40, a heat exchanger 60, and an acid gas enrichment system 100. Hydrocarbon gas treatment systems 10 also may be referred to herein as treatment systems 10 and/or simply as systems 10. Similarly, feed gas supply system 20 also may be referred to herein as a supply system 20 and/or simply as a system 20, hydrogen sulfide removal system 40 also may be referred to herein as a removal system 40 and/or simply as a system 40, and acid gas enrichment system 100 also may be referred to herein as an enrichment system 100 and/or simply as a system 100.

During operation of systems 10, feed gas supply system 20 may produce, generate, and/or provide a feed gas stream 22. Feed gas stream 22 generally includes hydrocarbon gas 24, carbon dioxide 26, and/or hydrogen sulfide 28. Feed gas stream 22 also may include one or more other components 29, examples of which include mercaptans and/or other sulfur-containing compounds.

Hydrogen sulfide removal system 40 may receive feed gas stream 22 from feed gas supply system 20 and may separate the feed gas stream into a product gas stream 42 and an acid gas stream 44. Product gas stream 42 includes a substantial portion of hydrocarbon gas 24 from feed gas stream 22. Acid gas stream 44 includes carbon dioxide 26 and a substantial portion of hydrogen sulfide 28 from feed gas stream 22. Heat exchanger 60 receives acid gas stream 44 from hydrogen sulfide removal system 40 and cools the acid gas stream to produce and/or generate a cooled acid gas stream 62.

Acid gas enrichment system 100 receives at least a portion of cooled acid gas stream 62 that was produced from heat exchanger 60. Acid gas enrichment system 100 then separates the portion of the cooled acid gas stream into a treated gas stream 102 and an enriched acid gas stream 104. Treated gas stream 102 includes a substantial portion of carbon dioxide 26 from portion of the cooled acid gas stream 62. Enriched acid gas stream 104 includes a substantial portion of hydrogen sulfide 28 from the portion of the cooled acid gas stream.

As discussed, heat exchanger 60 is configured to cool acid gas stream 44 to produce and/or generate cooled acid gas stream 62. In the systems and methods disclosed herein, an efficiency of separation of the acid gas stream into treated gas stream 102 and enriched acid gas stream 104 may be improved, or increased, by the presence of heat exchanger 60 when compared to otherwise identical hydrocarbon gas treatment systems that do not include heat exchanger 60.

With the above in mind, a cooled acid gas stream temperature of cooled acid gas stream 62 may be less than an acid gas stream temperature of acid gas stream 44. Stated another way, the cooled lean acid gas stream temperature may be at least a threshold acid gas stream temperature differential below the acid gas stream temperature. Stated yet another way, heat exchanger 60 may be configured to decrease the acid gas stream temperature by at least the threshold acid gas stream temperature differential to produce and/or generate the cooled acid gas stream. Examples of the threshold acid gas stream temperature differential include threshold temperature differentials of 10 degrees Celsius, 15 degrees Celsius, 20 degrees Celsius, 25 degrees Celsius, 30 degrees Celsius, and/or 35 degrees Celsius.

Examples of the cooled acid gas stream temperature include temperatures of at most 2 degrees Celsius, at most 4 degrees Celsius, at most 6 degrees Celsius, at most 8 degrees Celsius, at most 10 degrees Celsius, at most 12 degrees Celsius, at most 14 degrees Celsius, at most 15 degrees Celsius, at most 16 degrees Celsius, at most 18 degrees Celsius, and/or at most 20 degrees Celsius. Additional examples of the cooled acid gas stream temperature include temperatures of at least 0 degrees Celsius, at least 2 degrees Celsius, at least 4 degrees Celsius, at least 6 degrees Celsius, at least 8 degrees Celsius, and/or at least 10 degrees Celsius.

Heat exchanger 60 may include any suitable structure that may be adapted, configured, designed, and/or constructed to receive acid gas stream 44 and to cool the acid gas stream to produce and/or generate cooled acid gas stream 62. As an example, heat exchanger 60 may be configured to transfer thermal energy from acid gas stream 62 to a thermal management fluid stream 64 to generate the cooled acid gas stream. Under these conditions, heat exchanger 60 also may be configured to maintain fluid separation, or isolation, between the acid gas stream and the thermal management fluid stream. Examples of thermal management fluid stream 64 include a gas stream, an air stream, a liquid stream, a water stream, a seawater stream, and/or a refrigerant stream.

As illustrated in dashed lines in FIGS. 1-2, hydrocarbon gas treatment system 10 and/or heat exchanger 60 thereof also may include a cooling assembly 66. Cooling assembly 66, when present, may be configured to cool thermal management fluid stream 64 prior to thermal contact between the thermal management fluid stream and acid gas stream 44. Examples of cooling assembly 66 include a cooling tower, an evaporation unit, a refrigeration unit, and/or a direct expansion cooling assembly.

It is within the scope of the present disclosure that system 10 may be configured to receive thermal management fluid stream 64, to facilitate thermal contact between the thermal management fluid stream and the acid gas stream, and subsequently to discharge the thermal management fluid stream. The thermal management fluid stream may be received from a reservoir, or source, of the thermal management fluid and discharged back to the reservoir, or source. Additionally or alternatively, it is also within the scope of the present disclosure that system 10 thereof may include a closed loop thermal management fluid supply system 68, which may be configured to circulate thermal management fluid stream 64 in a closed loop that includes the heat exchanger.

As illustrated in dashed lines in FIGS. 1-2, system 10 also may include a water separation assembly 70. Water separation assembly 70, when present, may be configured to remove, or to separate, liquid water from cooled acid gas stream 62 and to produce and/or generate a water stream, or a liquid water stream 74, and a dewatered cooled acid gas stream 72. When system 10 includes water separation assembly 70, dewatered cooled acid gas stream 72 may be received by acid gas enrichment system 100 as the portion of cooled acid gas stream 62. An example of water separation assembly 70 includes a water knockout assembly.

Acid gas enrichment system 100 may include any suitable structure that may be adapted, configured, designed, and/or constructed to receive at least the portion of cooled acid gas stream 62 and to separate the portion of the cooled acid gas stream into the treated gas stream 102 and the enriched acid gas stream 104. As an example, and as illustrated in dashed lines in FIG. 2, acid gas enrichment system 100 may include a solvent contacting assembly 110, a solvent regeneration assembly 130, and a solvent recirculation assembly 150.

Solvent contacting assembly 110 may receive the portion of the cooled acid gas stream, such as via a cooled acid gas inlet 118, and may receive a lean solvent stream 112, such as via a lean solvent inlet 120. Lean solvent stream 112 may include, may consist of, and/or may consist essentially of a hydrogen sulfide-absorbing solvent 114. Solvent contacting assembly 110 may be configured to fluidly contact the portion of the cooled acid gas stream 62 with the lean solvent stream 112. Examples of solvent contacting assembly 110 include a solvent contactor and/or a solvent-contacting tank.

Lean solvent stream 112 may include, may consist of, and/or may consist essentially of a hydrogen sulfide-absorbing solvent, and solvent contacting assembly 110 may partition at least a portion of the hydrogen sulfide from the portion of the cooled acid gas stream into the lean solvent stream, thereby generating a rich solvent stream 116 and treated gas stream 102. Rich solvent stream 116 may include the portion of the hydrogen sulfide that is separated from the portion of the cooled acid gas stream that is provided to the solvent contacting assembly, and solvent contact assembly 110 may produce and/or discharge the rich solvent stream, such as via a rich solvent outlet 122.

An example of solvent regeneration assembly 130 includes a stripping vessel 131. Solvent regeneration assembly 130 may be configured to receive rich solvent stream 116, such as via a rich solvent inlet 134 of stripping vessel 131. Solvent regeneration assembly 130 may separate hydrogen sulfide from the rich solvent stream, thereby generating enriched acid gas stream 104 and a lean solvent recycle stream 132. Enriched acid gas stream 104 may be produced and/or discharged from the stripping vessel via an enriched acid gas outlet 136, and lean solvent recycle stream 132 may be produced and/or discharged from the stripping vessel via a recycled solvent outlet 138.

As illustrated in dashed lines in FIG. 2, solvent regeneration assembly 130 further may include a reboiler assembly 142. Reboiler assembly 142, when present, may be configured to receive lean solvent recycle stream 132 from the stripping vessel 131 and to vaporize at least a portion of the lean solvent recycle stream to produce and/or generate a vaporized solvent return stream 144. The vaporization of the portion of the lean solvent recycle stream may be accomplished via combustion of a fuel stream and/or via thermal contact with a heat stream 148. Stripping vessel 131 may include a vaporized solvent return stream inlet 146 configured to receive at least a portion of vaporized solvent return stream 144.

As also illustrated in dashed lines in FIG. 2, solvent regeneration assembly 130 may include a reflux system 170. Reflux system 170, when present, may be configured to return at least a portion of enriched acid gas stream 104 to stripping vessel 131 as a reflux stream 172, and stripping vessel 131 may include a reflux inlet 140 configured to receive the reflux stream.

Reflux system 170, when present, may include a condenser 174, a reflux accumulator 178, and/or a reflux pump 180. Condenser 174 may be configured to condense moisture from enriched acid gas stream 104 and to produce and/or generate a condensed water stream 176. Reflux accumulator 178 may be configured to accumulate at least a portion of the condensed water stream. Reflux pump 180 may be configured to return the portion of the condensed water stream to stripping vessel 131 as reflux stream 172.

Solvent recirculation assembly 150 may be configured to receive lean solvent recycle stream 132, such as from recycled solvent outlet 138, and to provide the lean solvent recycle stream to solvent contacting assembly 110 as, or as at least a portion of, lean solvent stream 112. As illustrated in dashed lines in FIG. 2, solvent recirculation assembly 150 may include a circulation pump 152. Circulation pump 152, when present, may be configured to convey lean solvent recycle stream 132 from solvent regeneration assembly 130 to and/or toward solvent contacting assembly 110 as lean solvent stream 112.

As also illustrated in dashed lines in FIG. 2, solvent recirculation assembly 150 may include a rich/lean heat exchanger 200. Rich/lean heat exchanger 200 may be configured to exchange thermal energy between rich solvent stream 116 and lean solvent recycle stream 132, such as to cool the lean solvent recycle stream and/or to heat the rich solvent stream.

As also illustrated in dashed lines in FIG. 2, solvent recirculation assembly 150 may include a lean solvent cooling assembly 156. Lean solvent cooling assembly 156 is configured to cool lean solvent recycle stream 132 to generate a cooled lean solvent recycle stream 133. Cooled lean solvent recycle stream 133 then may be provided to solvent contacting assembly 110 as, or as at least a portion of, lean solvent stream 112.

As discussed, lean solvent cooling assembly 156 is configured to cool lean solvent recycle stream 132 to generate cooled lean solvent recycle stream 133. In the systems and methods disclosed herein, an efficiency of hydrogen sulfide absorption, by lean solvent stream 112 and within solvent contacting assembly 110, may be improved, or increased, by the presence of lean solvent cooling assembly 156 when compared to otherwise identical acid gas enrichment systems that do not include the lean solvent cooling assembly and/or that do not cool a corresponding lean solvent stream to the extent that lean solvent cooling assembly 156 cools lean solvent recycle stream 132. In addition, cooling of lean solvent recycle stream 132 by lean solvent cooling assembly 156 may operate in cooperation with cooling of acid gas stream 44 by heat exchanger 60 to further improve the overall efficiency of hydrogen sulfide adsorption within solvent contacting assembly 110.

With the above in mind, a cooled lean solvent recycle stream temperature of cooled lean solvent recycle stream 133 may be less than a lean solvent recycle stream temperature of lean solvent recycle stream 132. Stated another way, the cooled lean solvent recycle stream temperature may be at least a threshold recycle stream temperature differential below the lean solvent recycle stream temperature. Stated yet another way, lean solvent cooling assembly 156 may be configured to decrease the lean solvent recycle stream temperature by at least the threshold recycle stream temperature differential to produce and/or generate the cooled lean solvent recycle stream. Examples of the threshold recycle stream temperature differential include threshold temperature differentials of 10 degrees Celsius, 15 degrees Celsius, 20 degrees Celsius, 25 degrees Celsius, 30 degrees Celsius, and/or 35 degrees Celsius.

Examples of the cooled lean solvent recycle stream temperature include temperatures of at most 2 degrees Celsius, at most 4 degrees Celsius, at most 6 degrees Celsius, at most 8 degrees Celsius, at most 10 degrees Celsius, at most 12 degrees Celsius, at most 14 degrees Celsius, at most 15 degrees Celsius, at most 16 degrees Celsius, at most 18 degrees Celsius, and/or at most 20 degrees Celsius. Additional examples of the cooled lean solvent recycle stream temperature include temperatures of at least 0 degrees Celsius, at least 2 degrees Celsius, at least 4 degrees Celsius, at least 6 degrees Celsius, at least 8 degrees Celsius, and/or at least 10 degrees Celsius.

The cooled lean solvent recycle stream temperature may be selected based, at least in part, on the cooled acid gas stream temperature. As an example, the cooled lean solvent recycle stream temperature may be equal, or at least substantially equal, to the cooled acid gas stream temperature. As another example, the cooled lean solvent recycle stream temperature may be within a threshold stream temperature difference of the cooled acid gas stream temperature. Examples of the threshold stream temperature difference include temperature differences of less than 1 degree Celsius, less than 2 degrees Celsius, less than 4 degrees Celsius, less than 6 degrees Celsius, less than 8 degrees Celsius, and/or less than 10 degrees Celsius.

Lean solvent cooling assembly 156 may include any suitable structure that may be adapted, configured, designed, and/or constructed to cool lean solvent recycle stream 132 to produce and/or generate cooled lean solvent recycle stream 133. As examples, lean solvent cooling assembly 156 may include a heat exchanger, a cooling tower, and/or a refrigeration assembly.

As also illustrated in dashed lines in FIG. 2, solvent recirculation assembly 150 further may include a filter 154. Filter 154, when present, may be configured to remove particulate material from at least a portion of lean solvent recycle stream 132 prior to supply of the lean solvent recycle stream to solvent contacting assembly 110 as lean solvent stream 112.

As also illustrated in dashed lines in FIG. 2, acid gas enrichment system 100 may include a flash vessel 190. Flash vessel 190, when present, may be configured to vaporize a portion of rich solvent stream 116 that is discharged from solvent contacting assembly 110 to generate a vaporized rich solvent stream 192. When acid gas enrichment system 100 includes flash vessel 190, vaporized rich solvent stream 192 may be separated from a remainder of rich solvent stream 116, which may be supplied to solvent regeneration assembly 130.

Feed gas supply system 20 may include any suitable structure that may be adapted, configured, designed, and/or constructed to produce, to generate, and/or to provide feed gas stream 22. As an example, feed gas supply system 20 may include a feed gas supply conduit 30 configured to convey feed gas stream 22 to hydrogen sulfide removal system 40. As another example, feed gas system 20 may include a feed gas supply compressor 32 configured to provide a motive force for flow of feed gas supply stream 22 to hydrogen sulfide removal system 40. As yet another example, feed gas supply system 20 may include a feed gas supply control valve 34 configured to control a flow rate of feed gas stream 22 that is supplied to hydrogen sulfide removal system 40. As another example, feed gas supply system 20 may include a hydrocarbon well 36 configured to produce and/or generate feed gas stream 22.

Hydrogen sulfide removal system 40 may include any suitable structure that may be adapted, configured, designed, and/or constructed to receive feed gas stream 22 and to separate the feed gas stream into product gas stream 42 and acid gas stream 44. As an example, hydrogen sulfide removal system 40 may include and/or be a solvent-contacting assembly 46 configured to fluidly contact feed gas stream 22 with a hydrogen sulfide-removal solvent to produce and/or generate the product gas stream and the acid gas stream.

As illustrated in dashed lines in FIG. 2, hydrocarbon gas treatment system 10 may include and/or may be in fluid communication with a sulfur recovery unit 220. Sulfur recovery unit 220, when present, may be configured to receive enriched acid gas stream 104 from acid gas enrichment system 100 and to generate an elemental sulfur stream 224 and a tail gas stream 222 from the enriched acid gas stream. As also illustrated in dashed lines in FIG. 2, sulfur recovery unit 220 may include a tail gas treatment assembly 226, which may be configured to recycle hydrogen sulfide from tail gas stream 222 to the sulfur recovery unit. Sulfur recovery unit 220 may generate elemental sulfur stream 224 and tail gas stream 222 from enriched acid gas stream 104 in any suitable manner. As an example, sulfur recovery unit 220 may utilize a Claus process to generate the elemental sulfur stream and the tail gas stream from the enriched acid gas stream.

The various streams, which are disclosed herein, which are utilized herein, and/or which are received and/or generated by the various components of hydrocarbon gas treatment system 10 may have any suitable composition, thermodynamic state, temperature, and/or pressure, examples of which are disclosed herein. In addition, hydrocarbon gas treatment system 10 may include, or may be referred to herein as including, any of the various streams. A hydrocarbon gas treatment system 10 may include one or more of feed gas stream 22, product gas stream 42, acid gas stream 44, cooled acid gas stream 62, thermal management fluid stream 64, dewatered cooled acid gas stream 72, liquid water stream 74, treated gas stream 102, enriched acid gas stream 104, lean solvent stream 112, hydrogen sulfide-absorbing solvent 114, rich solvent stream 116, lean solvent recycle stream 132, cooled lean solvent recycle stream 133, vaporized solvent return stream 144, heat stream 148, reflux stream 172, condensed water stream 176, vaporized rich solvent stream 192, elemental sulfur stream 224, and/or tail gas stream 222.

Feed gas stream 22 may include and/or define any suitable composition, or chemical composition. As an example, feed gas stream 22 may include and/or be a natural gas stream, such as may be produced and/or generated by hydrocarbon well 36. The natural gas may include hydrocarbon gas 24, such as methane, as well as carbon dioxide 26, hydrogen sulfide 28, and/or other components 29, examples of which are disclosed herein.

Product gas stream 42 may include and/or define any suitable composition, or chemical composition. As examples, product gas stream 42 may include at least 50 weight percent (wt %) of the hydrocarbon gas from the feed gas stream, at least 60 wt % of the hydrocarbon gas from the feed gas stream, at least 70 wt % of the hydrocarbon gas from the feed gas stream, at least 80 wt % of the hydrocarbon gas from the feed gas stream, at least 95 wt % of the hydrocarbon gas from the feed gas stream, and/or at least 99 wt % of the hydrocarbon gas from the feed gas stream. As additional examples, product gas stream 42 may include at least 40 wt % hydrocarbon gas, at least 50 wt % hydrocarbon gas, at least 60 wt % hydrocarbon gas, at least 70 wt % hydrocarbon gas, at least 80 wt % hydrocarbon gas, and/or at least 90 wt % hydrocarbon gas.

As further examples, the product gas stream may include at most 100 parts per million (ppm) hydrogen sulfide, at most 90 ppm hydrogen sulfide, at most 80 ppm hydrogen sulfide, at most 70 ppm hydrogen sulfide, at most 60 ppm hydrogen sulfide, at most 50 ppm hydrogen sulfide, at most 40 ppm hydrogen sulfide, at most 30 ppm hydrogen sulfide, at most 20 ppm hydrogen sulfide, at most 10 ppm hydrogen sulfide, at most 8 ppm hydrogen sulfide, at most 6 ppm hydrogen sulfide, at most 4 ppm hydrogen sulfide, and/or at most 2 ppm hydrogen sulfide. As yet another example, the product gas stream may include carbon dioxide.

Acid gas stream 44 may include and/or define any suitable temperature, pressure, and/or flow rate. As examples, acid gas stream 44 may have and/or define a flow rate of at least 100,000 standard cubic meters per day (SCM/Day), at least 150,000 SCM/Day, at least 200,000 SCM/Day, at least 250,000 SCM/Day, at least 300,000 SCM/Day, at least 400,000 SCM/Day, and/or at least 500,000 SCM/Day. As additional examples, acid gas stream 44 may have and/or define a pressure of at least 40 kilopascals gauge pressure (kPag), at least 50 kPag, at least 55 kPag, at least 60 kPag, at least 65 kPag, at least 70 kPag, at least 75 kPag, and/or at least 80 kPag. As further examples, acid gas stream 44 may have and/or define a pressure of at most 160 kPag, at most 150 kPag, at most 140 kPag, at most 130 kPag, at most 120 kPag, at most 110 kPag, and/or at most 100 kPag.

As additional examples, the acid gas stream temperature of acid gas stream 44 may be at least 40 degrees Celsius, at least 41 degrees Celsius, at least 42 degrees Celsius, at least 43 degrees Celsius, at least 44 degrees Celsius, at least 45 degrees Celsius, and/or at least 46 degrees Celsius. As further examples, the acid gas stream temperature may be at most 50 degrees Celsius, at most 49 degrees Celsius, at most 48 degrees Celsius, at most 47 degrees Celsius, at most 46 degrees Celsius, and/or at most 45 degrees Celsius.

Treated gas stream 102 may include and/or define any suitable composition, or chemical composition. As examples, treated gas stream 102 may include at least 50 wt % of the carbon dioxide from the cooled acid gas stream, at least 55 wt % of the carbon dioxide from the cooled acid gas stream, at least 60 wt % of the carbon dioxide from the cooled acid gas stream, at least 65 wt % of the carbon dioxide from the cooled acid gas stream, at least 70 wt % of the carbon dioxide from the cooled acid gas stream, at least 75 wt % of the carbon dioxide from the cooled acid gas stream, at least 80 wt % of the carbon dioxide from the cooled acid gas stream, at least 85 wt % of the carbon dioxide from the cooled acid gas stream, at least 90 wt % of the carbon dioxide from the cooled acid gas stream, and/or at least 95 wt % of the carbon dioxide from the cooled acid gas stream. As additional examples, treated gas stream 102 may include at least 50 wt % carbon dioxide, at least 55 wt % carbon dioxide, at least 60 wt % carbon dioxide, at least 65 wt % carbon dioxide, at least 70 wt % carbon dioxide, at least 75 wt % carbon dioxide, at least 80 wt % carbon dioxide, at least 85 wt % carbon dioxide, at least 90 wt % carbon dioxide, and/or at least 95 wt % carbon dioxide.

Enriched acid gas stream 104 may include and/or define any suitable composition, or chemical composition. As examples, enriched acid gas stream 104 may include at least 50 wt % of the hydrogen sulfide from the portion of the cooled acid gas stream, at least 55 wt % of the hydrogen sulfide from the portion of the cooled acid gas stream, at least 60 wt % of the hydrogen sulfide from the portion of the cooled acid gas stream, at least 65 wt % of the hydrogen sulfide from the portion of the cooled acid gas stream, at least 70 wt % of the hydrogen sulfide from the portion of the cooled acid gas stream, at least 75 wt % of the hydrogen sulfide from the portion of the cooled acid gas stream, at least 80 wt % of the hydrogen sulfide from the portion of the cooled acid gas stream, at least 85 wt % of the hydrogen sulfide from the portion of the cooled acid gas stream, at least 90 wt % of the hydrogen sulfide from the portion of the cooled acid gas stream, and/or at least 95 wt % of the hydrogen sulfide from the portion of the cooled acid gas stream.

As additional examples, enriched acid gas stream 104 may include at least 15 wt % hydrogen sulfide, at least 20 wt % hydrogen sulfide, at least 25 wt % hydrogen sulfide, at least 30 wt % hydrogen sulfide, at least 35 wt % hydrogen sulfide, at least 40 wt % hydrogen sulfide, at least 45 wt % hydrogen sulfide, and/or at least 50 wt % hydrogen sulfide. As further examples, enriched acid gas stream 104 may include at most 90 wt % hydrogen sulfide, at most 80 wt % hydrogen sulfide, at most 70 wt % hydrogen sulfide, at most 60 wt % hydrogen sulfide, at most 50 wt % hydrogen sulfide, and/or at most 40 wt % hydrogen sulfide.

Hydrogen sulfide-absorbing solvent 114 may include and/or define any suitable composition, or chemical composition. As examples, hydrogen sulfide-absorbing solvent 114 may include an amine solution, a tertiary amine solution, and/or a sterically hindered amine solution.

FIG. 3 is a flowchart depicting examples of methods 300, according to the present disclosure, of treating a hydrocarbon gas. Methods 300 may be performed with and/or utilizing a hydrocarbon gas treatment system, such as hydrocarbon gas treatment system 10 of FIGS. 1-2. Methods 300 include providing a feed gas stream at 310, separating the feed gas stream into a product gas stream and an acid gas stream at 320, and cooling the acid gas stream to generate a cooled acid gas stream at 330. Methods 300 also may include removing liquid water from the cooled acid gas stream at 340 and include separating the cooled acid gas stream into a treated gas stream and an enriched acid gas stream at 350. Methods 300 further may include reboiling a lean solvent recycle stream at 360, refluxing the enriched acid gas stream at 370, and/or separating the enriched acid gas stream into an elemental sulfur stream and a tail gas stream at 380.

Providing the feed gas stream at 310 may include providing the feed gas stream to a hydrogen sulfide removal system. Examples of the feed gas stream are disclosed herein with reference to feed gas stream 22 of FIGS. 1-2. Examples of the hydrogen sulfide removal system are disclosed herein with reference to hydrogen sulfide removal system 40 of FIGS. 1-2. As discussed herein, the providing at 310 may include providing the feed gas stream with a feed gas supply system, such as feed gas supply system 20 of FIGS. 1-2. Additionally or alternatively, the providing at 310 may include providing the feed gas stream from a hydrocarbon well, such as hydrocarbon well 36 of FIGS. 1-2.

Separating the feed gas stream into the product gas stream and the acid gas stream at 320 may include separating the feed gas stream with, within, via, and/or utilizing the hydrogen sulfide removal system. The product gas stream may include a substantial portion of the hydrocarbon gas from the feed gas stream. The acid gas stream may include carbon dioxide and a substantial portion of the hydrogen sulfide from the feed gas stream. More specific examples of the product gas stream are disclosed herein with reference to product gas stream 42 of FIGS. 1-2. More specific examples of the acid gas stream are disclosed herein with reference to acid gas stream 44 of FIGS. 1-2.

The separating at 320 may include contacting, within a solvent-contacting assembly, the feed gas stream with a hydrogen sulfide-removal solvent to generate the product gas stream and the acid gas stream. Examples of the solvent-contacting assembly are disclosed herein with reference to solvent-contacting assembly 46 of FIGS. 1-2. The separating at 320 additionally or alternatively may include separating such that the product gas stream and/or such that the feed gas stream have any suitable composition, flow rate, temperature, and/or pressure, examples of which are disclosed herein.

Cooling the acid gas stream to generate the cooled acid gas stream at 330 may include cooling the acid gas stream with, within, via, and/or utilizing a heat exchanger. Examples of the heat exchanger are disclosed herein with reference to heat exchanger 60 of FIGS. 1-2. The cooling at 330 may include cooling such that the cooled acid gas stream has any suitable cooled acid gas stream temperature, examples of which are disclosed herein. Additionally or alternatively, the cooling at 330 may include decreasing the acid gas stream temperature by any suitable acid gas stream temperature differential to produce and/or generate the cooled acid gas stream at the cooled acid gas stream temperature. Examples of the acid gas stream temperature differential are disclosed herein.

Removing liquid water from the cooled acid gas stream at 340 may include removing the liquid water in any suitable manner. As an example, the removing at 340 may include removing with, via, and/or utilizing a water separation assembly, examples of which are disclosed herein with reference to water separation assembly 70 of FIGS. 1-2.

Separating the cooled acid gas stream into the treated gas stream and the enriched acid gas stream at 350 may include separating at least a portion of the cooled acid gas stream with, within, via, and/or utilizing an acid gas enrichment system, such as acid gas enrichment system 100 of FIGS. 1-2. The treated gas stream may include a substantial portion of the carbon dioxide from the portion of the cooled acid gas stream. The enriched acid gas stream may include a substantial portion of the hydrogen sulfide from the portion of the cooled acid gas stream. Examples of the treated gas stream are disclosed herein with reference to treated gas stream 102 of FIGS. 1-2. Examples of the enriched acid gas stream are disclosed herein with reference to enriched acid gas stream 104 of FIGS. 1-2.

The separating at 350 may include contacting, at 352, the cooled acid gas stream with a lean solvent stream. This may include contacting within a solvent contacting assembly, such as solvent contacting assembly 110 of FIG. 2. The lean solvent stream may include a hydrogen sulfide-absorbing solvent, and the contacting at 352 may include contacting to partition, or may include partitioning, at least a portion of the hydrogen sulfide from the portion of the cooled acid gas stream into the lean solvent stream. This process may produce and/or generate a rich solvent stream and a treated gas stream. The rich solvent stream may include the hydrogen sulfide-absorbing solvent and the portion of the hydrogen sulfide from the portion of the cooled acid gas stream.

The separating at 350 also may include separating, at 354, hydrogen sulfide from the rich solvent stream to generate an enriched acid gas stream and a lean solvent recycle stream. This may include separating within a solvent regeneration assembly, such as solvent regeneration assembly 130 of FIG. 2. The enriched acid gas stream may include hydrogen sulfide, and examples of the enriched acid gas stream are disclosed herein with reference to enriched acid gas stream 104 of FIGS. 1-2. The lean solvent recycle stream may include the hydrogen sulfide-absorbing solvent.

The separating at 350 further may include recirculating, at 356, the lean solvent recycle stream such that the lean solvent stream comprises at least a fraction, a majority, or even an entirety of the lean solvent stream. This may include recirculating with, via, and/or utilizing a solvent recirculation assembly, such as solvent recirculation assembly 150 of FIG. 2.

The recirculating at 356 also may include cooling, at 357, the lean solvent recycle stream to produce and/or generate a cooled lean solvent recycle stream and utilizing the cooled lean solvent recycle stream as the fraction of the lean solvent stream. The cooling at 357 may include cooling with, via, and/or utilizing a lean solvent cooling assembly, such as lean solvent cooling assembly 156 of FIG. 2. Examples of the cooled lean solvent recycle stream, temperatures of the cooled solvent recycle stream, and/or threshold recycle stream temperature differentials by which the lean solvent recycle stream is cooled to generate the cooled lean solvent recycle stream are disclosed herein with reference to lean solvent cooling assembly 156 of FIG. 2.

Reboiling the lean solvent recycle stream at 360 may include reboiling the lean solvent recycle stream to vaporize at least a portion of the lean solvent recycle stream and/or to generate a vaporized solvent return stream. This may include reboiling with, via, and/or utilizing a reboiler assembly, such as reboiler assembly 142 of FIG. 2. The reboiling at 360 may include utilizing a portion of the vaporized solvent return stream during the separating at 354. The reboiling at 360 additionally or alternatively may include utilizing a remainder of the vaporized solvent return stream as the at least a fraction of the lean solvent stream. Examples of the vaporized solvent return stream are disclosed herein with reference to vaporized solvent return stream 144 of FIG. 2.

Refluxing the enriched acid gas stream at 370 may include refluxing at least a portion of the enriched acid gas stream as part of the separating at 354. As an example, the refluxing at 370 may include refluxing water condensed from the enriched acid gas stream. The refluxing at 370 may include refluxing with, via, and/or utilizing a reflux system, such as reflux system 170 of FIG. 2.

Separating the enriched acid gas stream into the elemental sulfur stream and the tail gas stream at 380 may include separating with, via, and/or utilizing a sulfur recovery unit, such as sulfur recovery unit 220 of FIGS. 1-2. Additionally or alternatively, the separating at 380 may include separating with, via, and/or utilizing a Claus process. When methods 300 include the separating at 380, the methods further may include utilizing the tail gas stream during the separating at 350.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A hydrocarbon gas treatment system, comprising:
    a feed gas supply system configured to provide a feed gas stream, wherein the feed gas stream includes hydrocarbon gas, carbon dioxide, and hydrogen sulfide;
    a hydrogen sulfide removal system configured to receive the feed gas stream and to separate the feed gas stream into a product gas stream, which includes a portion of the hydrocarbon gas from the feed gas stream, and an acid gas stream, which includes carbon dioxide and a portion of the hydrogen sulfide from the feed gas stream;
    a sub-ambient heat exchanger downstream and not upstream of the hydrogen sulfide removal system and configured to receive the acid gas stream and to cool the acid gas stream to a sub-ambient temperature to thereby generate a cooled acid gas stream;
    a water separation assembly downstream and not upstream of the sub-ambient heat exchanger and configured to remove liquid water from the cooled acid gas stream to thereby generate a dewatered cooled acid gas stream; and
    an acid gas enrichment system downstream and not upstream of the water separation assembly and configured to receive at least a portion of the dewatered cooled acid gas stream from the water separation assembly and to separate the portion of the dewatered cooled acid gas stream into a treated gas stream, which includes at least 50 weight percent of the carbon dioxide from the portion of the cooled acid gas stream, and an enriched acid gas stream, which includes at least 50 weight percent of the hydrogen sulfide from the portion of the dewatered cooled acid gas stream.

2. The hydrocarbon gas treatment system of claim 1, wherein the heat exchanger is configured to transfer thermal energy from the acid gas stream to a thermal management fluid stream to generate the cooled acid gas stream and to maintain fluid separation between the acid gas stream and the thermal management fluid stream.

3. The hydrocarbon gas treatment system of claim 1, wherein a cooled acid gas stream temperature of the cooled acid gas stream is less than an acid gas stream temperature of the acid gas stream.

4. The hydrocarbon gas treatment system of claim 3, wherein at least one of:
    (i) the cooled acid gas stream temperature is at most 15 degrees Celsius;
    (ii) the cooled acid gas stream temperature is at least 4 degrees Celsius; and
    (iii) the cooled acid gas stream temperature is at least 25 degrees Celsius less than the acid gas stream temperature.

5. The hydrocarbon gas treatment system of claim 1, wherein the acid gas enrichment system includes:
    (i) a solvent contacting assembly configured to fluidly contact the portion of the dewatered cooled acid gas stream with a lean solvent stream, which includes a hydrogen sulfide-absorbing solvent, to partition at least a portion of the hydrogen sulfide from the portion of the dewatered cooled acid gas stream into the lean solvent stream, and to generate a rich solvent stream, which includes the portion of the hydrogen sulfide from the portion of the dewatered cooled acid gas stream, and the treated gas stream;

(ii) a solvent regeneration assembly configured to separate the hydrogen sulfide from the rich solvent stream to generate the enriched acid gas stream and a lean solvent recycle stream; and (iii) a solvent recirculation assembly configured to provide the lean solvent recycle stream to the solvent contacting assembly as the lean solvent stream.

6. The hydrocarbon gas treatment system of claim 5, wherein the solvent regeneration assembly includes a stripping vessel.

7. The hydrocarbon gas treatment system of claim 6, wherein the solvent regeneration assembly further includes a reboiler assembly configured to receive the lean solvent recycle stream from the stripping vessel and to vaporize at least a portion of the lean solvent recycle stream to generate a vaporized solvent return stream, wherein the stripping vessel includes a vaporized solvent return stream inlet configured to receive a portion of the vaporized solvent return stream.

8. The hydrocarbon gas treatment system of claim 7, wherein the solvent regeneration assembly further includes a reflux system configured to return at least a portion of the enriched acid gas stream to the stripping vessel as a reflux stream.

9. The hydrocarbon gas treatment system of claim 8, wherein the reflux system includes:

(i) a condenser configured to condense moisture from the enriched acid gas stream to generate a condensed water stream;

(ii) a reflux accumulator configured to accumulate at least a portion of the condensed water stream; and (iii) a reflux pump configured to return the portion of the condensed water stream to the stripping vessel as the reflux stream.

10. The hydrocarbon gas treatment system of claim 5, wherein the solvent recirculation assembly includes a circulation pump configured to convey the lean solvent recycle stream from the solvent regeneration assembly to the solvent contacting assembly as the lean solvent stream.

11. The hydrocarbon gas treatment system of claim 5, wherein the solvent recirculation assembly includes a filter configured to remove particulate material from at least a portion of the lean solvent recycle stream.

12. The hydrocarbon gas treatment system of claim 5, wherein the solvent recirculation assembly includes a lean solvent cooling assembly configured to cool the lean solvent recycle stream to generate a cooled lean solvent recycle stream, which is provided to the solvent contacting assembly as the lean solvent stream.

13. The hydrocarbon gas treatment system of claim 12, wherein a cooled lean solvent recycle stream temperature of the cooled lean solvent recycle stream is less than a lean solvent recycle stream temperature of the lean solvent recycle stream.

14. The hydrocarbon gas treatment system of claim 13, wherein at least one of:

(i) the cooled lean solvent recycle stream temperature is at most 15 degrees Celsius;

(ii) the cooled lean solvent recycle stream temperature is at least 4 degrees Celsius; and (iii) the cooled lean solvent recycle stream temperature is at least 25 degrees Celsius less than the lean solvent recycle stream temperature.

15. The hydrocarbon gas treatment system of claim 5, wherein the acid gas enrichment system includes a flash vessel configured to vaporize a portion of the rich solvent stream to generate a vaporized rich solvent stream prior to supply of a remainder of the rich solvent stream to the solvent regeneration assembly.

16. The hydrocarbon gas treatment system of claim 5, wherein the acid gas enrichment system includes a rich/lean heat exchanger configured to exchange thermal energy between the rich solvent stream and the lean solvent recycle stream.

17. The hydrocarbon gas treatment system of claim 5, wherein the acid gas enrichment system includes the hydrogen sulfide-absorbing solvent.

18. The hydrocarbon gas treatment system of claim 5, wherein the hydrogen sulfide-absorbing solvent includes at least one of an amine solution, a tertiary amine solution, and a sterically hindered amine solution.

19. The hydrocarbon gas treatment system of claim 5, wherein the hydrocarbon gas treatment system further includes a sulfur recovery unit configured to receive the enriched acid gas stream and to generate an elemental sulfur stream and a tail gas stream from the enriched acid gas stream.

20. A method of treating a hydrocarbon gas using the hydrocarbon gas treatment system of claim 1, the method comprising:

providing a feed gas stream to a hydrogen sulfide removal system, wherein the feed gas stream includes hydrocarbon gas, carbon dioxide, and hydrogen sulfide;

separating the feed gas stream into a product gas stream, which includes a substantial portion of the hydrocarbon gas from the feed gas stream, and an acid gas stream, which includes carbon dioxide and a substantial portion of the hydrogen sulfide from the feed gas stream;

cooling the acid gas stream to generate a cooled acid gas stream; and separating at least a portion of the cooled acid gas stream into a treated gas stream, which includes a substantial portion of the carbon dioxide from the portion of the cooled acid gas stream, and an enriched acid gas stream, which includes a substantial portion of the hydrogen sulfide from the portion of the cooled acid gas stream.

* * * * *